United States Patent [19]

Airhart

[11] 4,007,803
[45] Feb. 15, 1977

[54] EXPANDING DETONATION CHAMBER MULTI-SHOT GAS EXPLODER

[75] Inventor: Tom Patterson Airhart, Plano, Tex.
[73] Assignee: Atlantic Richfield Company, Los Angeles, Calif.
[22] Filed: Jan. 19, 1976
[21] Appl. No.: 650,370
[52] U.S. Cl. .............................. 181/117; 173/135; 227/9
[51] Int. Cl.² ........................................ G01V 1/12
[58] Field of Search .............. 227/9; 181/113, 116, 181/117; 123/46 H; 173/135

[56] References Cited
UNITED STATES PATENTS

| 3,198,282 | 8/1965 | Dunaway | 181/117 |
| 3,215,233 | 11/1965 | Kirby et al. | 181/117 |
| 3,429,396 | 2/1969 | Jenner et al. | 181/117 |
| 3,958,661 | 5/1976 | Dransfield et al. | 181/117 |
| 3,967,688 | 7/1976 | Inenaga et al. | 123/46 H |

Primary Examiner—Howard A. Birmiel
Attorney, Agent, or Firm—Robert M. Betz

[57] ABSTRACT

An expandable ignition chamber within an upstanding cylinder is formed between its base and a massive free piston. Initial detonation of a combustible gas mixture within the chamber drives the piston upwardly to expose in sequence a series of vertically spaced gas inlets in the cylinder wall, through which the supply of gas is replenished to support a corresponding sequence of additional rapidly timed detonations. Repetitive seismic pulses are thereby supplied by the downward thrust of the base which is itself slidable with respect to the cylinder walls

8 Claims, 3 Drawing Figures

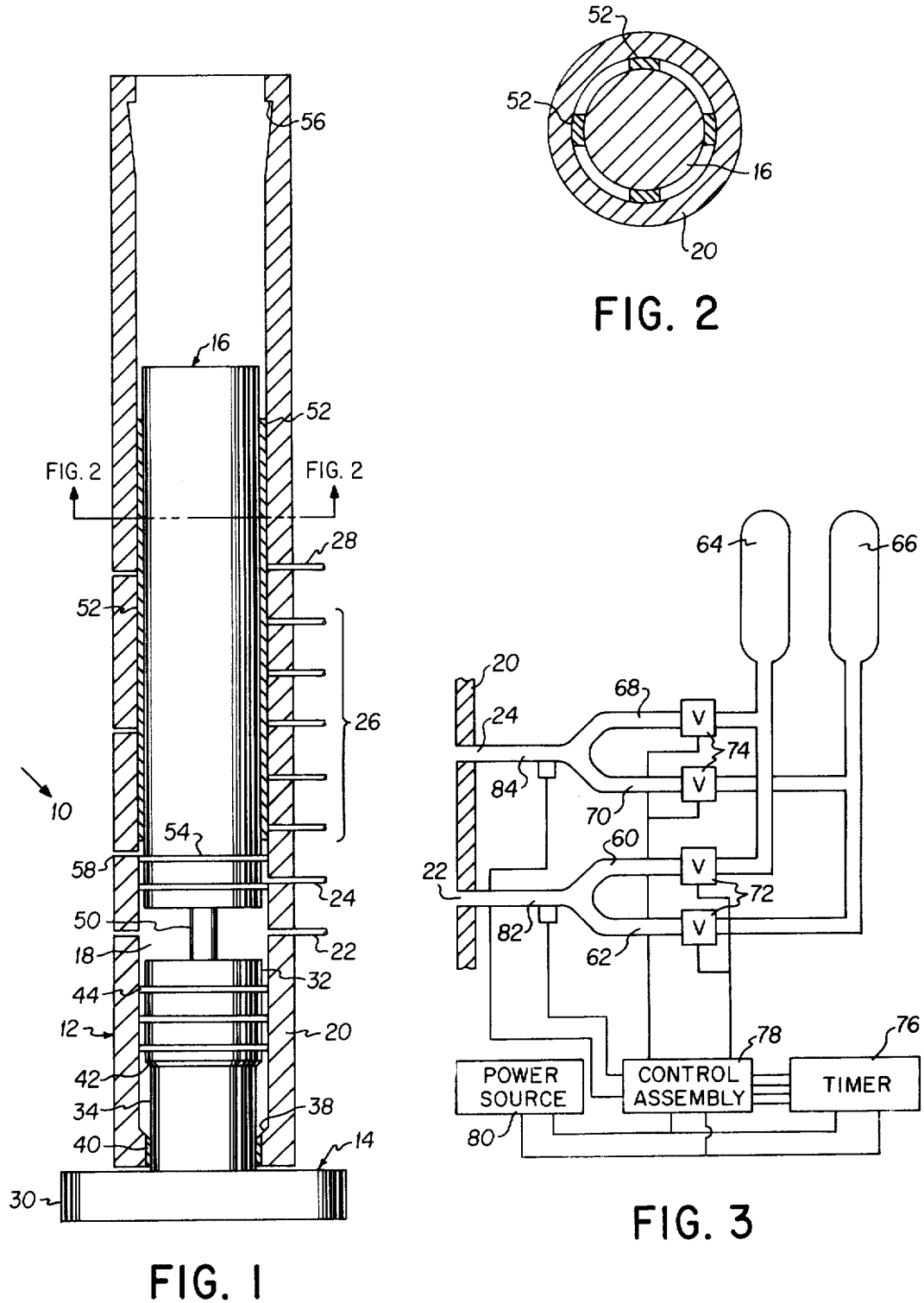

EXPANDING DETONATION CHAMBER MULTI-SHOT GAS EXPLODER

BACKGROUND OF THE INVENTION

1. Field of the Invention

This invention is generally related to the field of seismic gas exploders and more particularly to devices of this character capable of delivering a series of rapid high energy acoustic pulses which may be injected into the earth. A widely known type of gas exploder manufactured under the name DINOSEIS, a Registered Trademark of Atlantic Richfield Company, utilizes a combustion chamber formed between a pair of rigid telescoping members, inlet means for introduction therein of a fuel gas and an oxidizing gas, spark means, and exhaust means for scavenging spent gases from the combustion chamber. The spark means is actuated to ignite a combustible mixture of the fuel gas and oxidizing gas so as to create an impulse adapted to drive the two rigid members apart. In use, the device either rests on the ground or is supported so that one of the rigid members impacts the ground on detonation.

If it is desired to employ a device of this character for producing a series of repetitive seismic shock waves or other similar signals, the spent gases from each shot have to be substantially removed from the chamber prior to the succeeding shot and also the two rigid members have to be returned to their original relation through gravity means, air spring return or the like. Both of these steps introduce time delays which prevent the production of acoustic pulses at a rate faster than every 1 or 2 seconds.

Another reason why a conventional gas exploder of this type is not well suited to the production of seismic pulses at a rapid repetition rate is that unless severely restrained the device will lift off the ground with each impulse. A very rapid return to earth will necessarily produce an undesirable secondary pulse which will interfere with the production of pulses of desired character and obscure the reflections therefrom. Experience has shown that when such a device is severely restrained against reactive movement away from the earth the desired detonation shock waves do not develop.

Another prior art device which produces repetitive impacts is the jackhammer. This is a basically low energy device adapted for surface penetration. It operates through the pressure of compressed air rather than detonation of an explosive mixture, which is a characteristic of the device to be described.

Also well-known is the diesel pile driver which operates through the cyclic travel of a heavy weight subjected to gravity fall. This is a high energy device which operates on diesel principle but is relatively slow in repetition rate, i.e., on the order of about three seconds per cycle.

It is therefore a general object of this invention to provide a novel form of seismic gas exploder adapted to inject high energy acoustic pulses into the earth at a high repetition rate.

It is a more specific object of this invention to provide a device of this character which is not dependent for its operation upon the reciprocal or cyclic motion of two chamber-forming members movable relative to each other.

SUMMARY OF THE INVENTION

In accordance with a preferred embodiment of this invention, a multi-shot gas exploder seismic source includes an upstanding cylinder having an enclosed base coupled to the earth and having movable therein a piston so as to form an expansible combustion chamber between the base and the piston. The sidewall of the cylinder is perforated by a plurality of vertically spaced gas inlets which are sequentially exposed to the combustion chamber by the upward movement of the piston. The detonation of a charge of combustible gas mixture introduced within the chamber through the bottommost of these gas inlets drives the piston in this upward direction and applies a detonation shock wave to the base. As each inlet in turn is exposed to the chamber, a further charge of combustible gas is introduced and detonated within the chamber with the net result that a series of detonation waves propagate through the expanding chamber as the piston continues to move upward. Exhaust ports may be positioned at vertically spaced intervals along the cylinder sidewall opposite the gas inlets to scavenge a portion of the spent gases. However, the operation of the device contemplates that each successive detonation wave propagates through a greater thickness of spent gases before reaching the base of the cylinder and producing the desired seismic pulse. The piston is preferably designed to travel freely in an upward direction without the restraint of any spring mechanism so that the maximum upward velocity after each detonation is approximately the same. With this device, an acoustic pulse can be produced at least every 1/20 to ½ second.

BRIEF DESCRIPTION OF THE DRAWINGS

FIG. 1 is a vertical sectional of a seismic gas exploder in accordance with this invention.

FIG. 2 is a sectional view taken along the line 2—2 in FIG. 1.

FIG. 3 is a block diagram of a gas charging and ignition system in accordance with this system.

DESCRIPTION OF THE PREFERRED EMBODIMENTS

Referring now to the drawings and more particular to FIG. 1, a gas exploder 10, in accordance with this invention typically includes an upstanding outer cylinder 12, a base 14 adapted to rest on or coupled to earth and a piston 16 within the cylinder 12 and adapted to define with the cylinder 12 and the base 14 an expansible combustion chamber 18. The gas exploder 10 may be truck-mounted for transport and supported so that it may be conveniently raised or lowered. This may be accomplished, for example, by truck-supported hydraulic cylinders having their pistons rigidly interconnected with cylinder 12. The details of such construction are not part of this invention and are well within the skill of the art.

The sidewall 20 of the cylinder 12 is perforated by a plurality of vertically spaced apart gas inlets consisting of a bottommost inlet 22, a next adjacent inlet 24, further intermediate inlets 26 and uppermost 28. Combustible gas mixture is introduced into the chamber 18 through the gas inlets 22-28 in a sequential manner as will be hereafter explained.

The base 14 consists generally of a bottom plate 30 against which the bottom of the cylinder 12 rests before firing and a base piston 32 slidable within the cylinder 12 and interconnected with the bottom plate 30 by means of a reduced diameter shank 34. The bore diameter of the bottom end of the cylinder 12 is decreased to form an internal shoulder 38 which serves two purposes. It serves as a mount for a bearing 40 as of babbitt metal to facilitate the movement of the shank 34. Also, the shoulder 38 limits the extent of downward travel of the base piston 32 relative to the cylinder 12 when it engages the mating shoulder 42 on the undersurface of the base piston 32. This will occur when the cylinder 12 is raised above the ground for transport. In order to provide an adequate seal for the chamber 18, the base piston 32 is provided with metal piston rings 44.

Affixed to the top surface of the base piston 32 is a standoff plug 50 which serves to limit the downward travel of the piston 16 within the cylinder 12 by engaging the lower surface of the main piston 16. In this position, the bottommost gas inlet 22 is exposed to the chamber 18. The length of the piston 16 is not critical but is selected to provide sufficient mass to determine in conjunction with other factors the desired piston velocity as its upward movement successively exposes inlets 24–28 to the combustion chamber 18, in a manner which will be more fully explained below. With additional reference to FIG. 2, it may be observed that the surface of the piston 16 is typically provided with a series of equally spaced longitudinal bearing strips 52 to reduce friction and misalignment between the relatively long facing surfaces of the piston 16 and the cylinder 12. Below the bottom extent of the bearing strips 52, the piston 16 is provided with piston rings 54 to seal the upper end of the expansible cavity 18.

It is a feature of this invention that the piston 16 is able to travel freely in a vertical direction without the interposition of any air box spring bias or the like. Therefore, after the bottom surface of the piston 16 clears the uppermost gas inlet 28, it is desirable for safety purposes to limit its complete escape from the cylinder 12. To this end the bore of the upper end of the cylinder 12 tapers outwardly to form a shoulder 56. The rings 54, being under tension, will expand upon reaching this tapered bore so that the shoulder 56 serves as a detent to block the travel of the piston 16. Although this is an unlikely circumstance, the rings 54 are sacrificial in nature and serve to avoid communication of undesirable shocks to the cylinder 12 or any supporting mechanism to which it is attached. Opposite the gas inlets 22–28, the sidewall 20 of the cylinder 12 may be further perforated with a plurality of exhaust ports 58 with equal or variable vertical spacing preferably closest toward the bottom of cylinder 12.

In order to operate the exploder 10, it will be necessary to interconnect the gas inlets 22–28 with a gas charging and ignition system such as is shown in FIG. 3. It should be understood however that the invention does not reside in this gas charging and ignition system per se, and therefore no detailed description thereof is believed to be required. Systems which may be adapted for sequentially fueling and firing a plurality of separate gas exploders are well-known, and those skilled in this art will have no difficulty in adapting those known techniques to the present invention.

With the above in mind and for illustrative purposes, two adjacent gas inlets such as the inlets 22 and 24 are shown as they may be interconnected with a fueling and ignition system. It will be understood that the remaining inlets 26 and 28 are also operatively interconnected with such system. The inlet 22 is thus interconnected with separate conduits 60 and 62 fed respectively from an oxidizing gas bottle 64 and a fuel gas bottle 66. In like manner, the inlet 24 is supplied from a pair of conduits 68 and 70 which also interconnect respectively with bottles 64 and 66. Solenoid operated valves 72 limit gas flow into inlet 22 and a like pair of valves 74 limit gas flow into inlet 24. A timer 76 may be set so that, through a control assembly 78, the valves 72 and 74 are opened and closed sequentially at any desired time intervals. A power source 80 is provided for energizing the timer 76 and control assembly 78. An igniting spark is supplied to the gas mixture by means of spark plugs 75 positioned respectively within conduits 82 or 84 interconnected between inlets 22 and 24 and their respective individual gas feed lines.

In operation a combustible gas mixture is introduced within the bottommost inlet 22 to fill the chamber 18 and the gas mixture is ignited immediately thereafter, or with at most a few milliseconds delay. A detonation shock front proceeds from the spark plug 75 through the connective manifold 82 through the inlet 22 into the chamber 18 and thereupon acts against the respective lower and upper surfaces of the piston 16 and the base piston 32 to provide an initial seismic pulse downward through the base 14 and to initiate upward movement of the piston 16. As the bottom surface of the piston 16 clears the inlet 24, the timer 76 acts to inject the next charge of combustible gas mixture into the chamber 18 and also controls the occurrence of the succeeding detonation to provide the next seismic pulse. As the upward travel of the piston 16 continues and as each succeeding inlet of sequence 26 or uppermost inlet 28 is passed in succession, an additional charge of gas is injected into the chamber 18 and ignited so as to establish a succession of detonation waves and seismic pulses.

Clearly, it is necessary to coordinate carefully the upward travel of the piston 16 with the timing sequence of the fuel injection and ignition system. In an initial test in accordance with this invention, a gas fill time of the chamber 18 in its initial position was 200 milliseconds almost immediately followed by the first detonation. 150 milliseconds after the first detonation, the chamber 18 received a second charge with a fill time of 250 milliseconds with a second detonation. After a further delay of 150 milliseconds the next adjacent inlet was given a 100 millisecond gas fill time and fired with a third successful detonation. Based on these initial experiments, therefore, the device demonstrates an ability to provide sequential seismic pulses at intervals in the range from 250 to 400 milliseconds apart.

After each detonation with the gas exploder 10, a quantity of spent combustion gases occupies the chamber 18 and remains therein to the extent not scavenged through one or more of the exhaust ports 58. As the piston 16 moves upwardly following each detonation, the pressure within the chamber 18 is reduced, a fact which aids in the rapid injection of each successive charge of combustible gas mixture through the sequentially exposed inlets 24–28. It is a feature of this invention that the presence of residual gases in progressively greater amount within the expanding chamber 18 does not correspondingly degrade the amplitude of the detonation pulse obtainable. Mixing occurs between fresh and spent gases so that a gradient exists between top and bottom of chamber 18 rather than a sharp line of demarcations. However the strength of a detonation pulse appears to depend primarily upon the amount of fresh gas introduced within the expanding chamber 18 prior to each detonation. Although this gas is typically introduced at the top, additional control may be provided in accordance with this invention by introducing fresh gas mixture into the chamber 18 simultaneously through the last inlet to be exposed and through a lower inlet. This will enhance the total energy content of the detonation pulse.

The travel of the piston 16 is preferably controlled so that with each shot its velocity reaches a maximum and then slows so that each succeeding shot brings the velocity again up to substantially the same figure. In this way, the vertical spacing of the inlets 22–28 may be made approximately uniform. However, it is evident that within the scope of this invention such spacing may be varied, if desired, in order to effect selected irregular time intervals between shots.

After rising to its maximum extent, the piston 16 falls under the influence of gravity to its lowest limiting position. As it does so, it forces spent gases out through exhaust ports 58, which are sized and spaced to control the velocity of its return. In a cyclic operation, the firing of the exploder 10 with a gas fill through the bottom inlet 22 may be timed so as to avoid impact between the standoff block 50 and the lower surface of the main piston 16 thus eliminating any undesirable secondary pulse. Those skilled in this art will have no difficulty in devising cushioning means for limiting the downward travel of the piston 16 so as to avoid any such secondary pulse.

A feature of this invention is the fact that with each succeeding shot the base 14 is adapted to move downwardly to deliver a seismic pulse independently of movement of the cylinder 12. Thus, the device may be operated without lifting off the ground and thereby communicating undesirable shock loading or side loads to a fixed mounting assembly or a portable mount such as a truck body. By the same token, this eliminates the need for a general category of auxiliary equipment known as catchers or guidance systems for gas exploders.

It should be understood that in its broadest concept, the invention is not limited to the particular configuration of the cylinder 12, the base 14, and the piston 16. Any association of rigid bodies in telescoping relation for relative vertical movement to create an expansible combustion chamber can be adapted to the purposes of this invention. Thus, many modifications of the illustrative embodiment will occur to those skilled in the art without departing from the scope of the invention as more particularly set forth in the appended claims.

The embodiments of the invention in which an exclusive property or privilege is claimed are defined as follows:

1. A multi-shot seismic gas exploder comprising:
   a. a rigid upper and a rigid lower member disposed in telescoping relation so as to define an expansible enclosed combustion chamber therebetween,
   b. means for sequentially injecting a plurality of charges of combustible gas mixture into said combustion chamber at timed intervals, and
   c. means for separately igniting said plurality of charges to establish a like number of successive detonation fronts within said combustion chamber during the continuous expansion thereof adapted collectively to separate said upper and lower members in a single, noncyclic, vertical movement.

2. A multi-shot seismic exploder comprising:
   a. an upstanding outer cylinder having an enclosed base coupled to the earth, the side wall of said cylinder being penetrated by a plurality of vertically spaced gas inlets;
   b. a piston slidable within said cylinder so that, in combination with said side wall and said base, it defines an expansible combustion chamber, so that upward travel of said piston exposes said inlets in ascending sequence to said combustion chamber;
   c. means actuable in timed relation to said upward travel for injecting a plurality of separate charges of combustible gas mixture into said combustion chamber through said respective inlets in said ascending sequence; and
   d. means for detonating each such charge within the combustion chamber upon injection therein, whereby said piston is driven continuously upward to enable successive injection and detonation of said plurality of charges, repetitive seismic pulses being thereby supplied by the corresponding succession of downward thrusts of said base against the earth.

3. A device as in claim 2 including means for limiting the downward travel of said piston so that at least one of said gas inlets is constantly exposed to said chamber.

4. A device as in claim 2 including vertically spaced exhaust port means in said side wall of said cylinder.

5. A device as in claim 2 wherein said enclosed base is slidably interconnected with said cylinder side wall so as to enable relative vertical movement therebetween.

6. A device as in claim 5 wherein said base comprises a bottom pan interconnected with a second piston movable within the side wall of said cylinder.

7. A device as in claim 5 comprising means for limiting the relative movement of said base with said cylinder side wall.

8. A device as in claim 2 comprising means for limiting the relative movement of said piston and said cylinder.

* * * * *